United States Patent [19]

Dennis et al.

[11] 4,352,177
[45] Sep. 28, 1982

[54] AUTOMATIC RECORD PLAYER

[75] Inventors: James T. Dennis, P.O. Box 15100, Oklahoma City, Okla. 73155; George Kolomayets, Chicago, Ill.

[73] Assignee: James T. Dennis, Oklahoma City, Okla.

[21] Appl. No.: 211,859

[22] Filed: Dec. 1, 1980

Related U.S. Application Data

[60] Division of Ser. No. 9,254, Feb. 5, 1979, Pat. No. 4,291,886, which is a continuation of Ser. No. 813,225, Jul. 5, 1977, abandoned.

[51] Int. Cl.³ .............................................. G11B 3/10
[52] U.S. Cl. .................................................. 369/246
[58] Field of Search ..................... 369/245, 246, 230

[56] References Cited

U.S. PATENT DOCUMENTS

| | | | |
|---|---|---|---|
| 2,366,858 | 1/1945 | Knox et al. | 369/230 |
| 3,973,777 | 8/1976 | Guha | 369/246 |
| 4,129,305 | 12/1978 | Wittenberg | 369/230 |

Primary Examiner—Steven L. Stephan
Attorney, Agent, or Firm—Mason, Kolehmainen, Rathburn & Wyss

[57] ABSTRACT

A phonograph record player mechanism is provided which includes a tone arm, means for mounting the tone arm for rotation about an axis, a cueing lever lift rod adapted to engage the tone arm at a point spaced from said axis, and a flat spring having one end thereof connected to said lift rod, means defining a fixed shoulder in engagement with one side of the spring and a cueing lever which is rotatable about a substantially horizontal axis and has a portion which engages the other side of the spring between the lift rod and the shoulder when the cueing lever is rotated about said horizontal axis.

7 Claims, 3 Drawing Figures

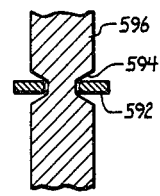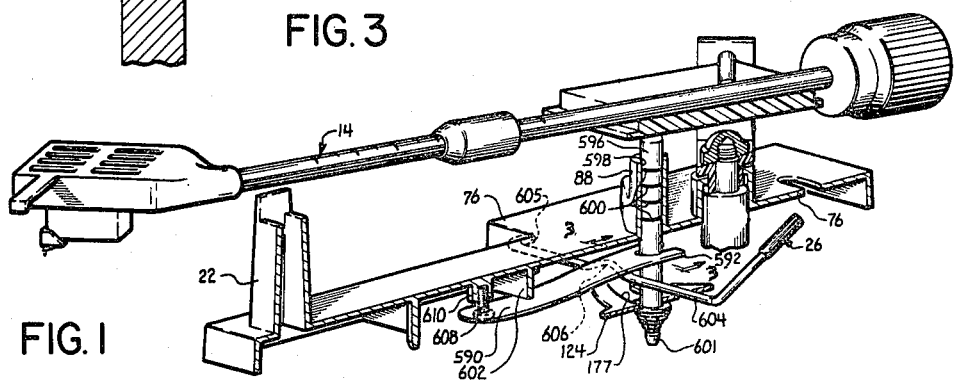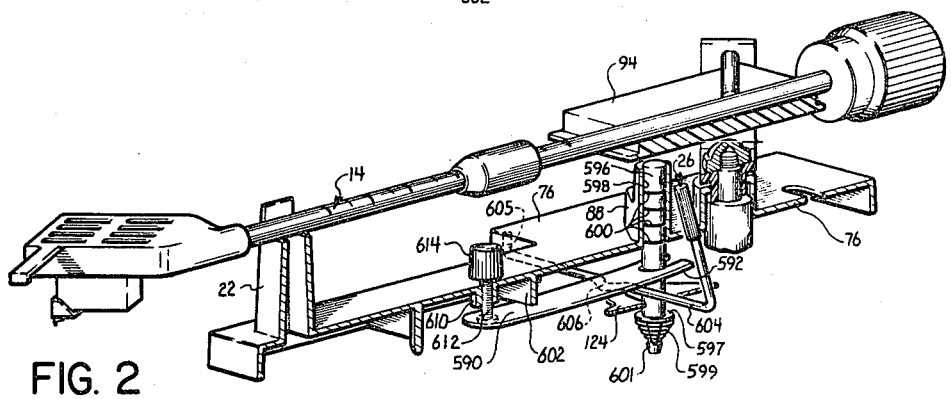

4,352,177

AUTOMATIC RECORD PLAYER

AUTOMATIC RECORD PLAYER

The present invention is a division of my copending application Ser. No. 009,254, filed Feb. 5, 1979, which is itself a continuation of parent application Ser. No. 813,225, filed July 5, 1977, now abandoned, said application Ser. No. 009,254 having issued as Pat. No. 4,291,886.

The present invention relates to record changers, and more particularly, to automatic record changers which are arranged to play a series of phonograph records in the order in which the records are placed on the centering spindle of the record changer.

It is an another object of the present invention to provide a simplified cueing lever arrangement for use in an automatic record changer which may be employed for manually raising and lowering the tone arm.

The invention both as to its organization and method of operation, together with further objects and advantages thereof, will best be understood by reference to the following specification taken in connection with the accompanying drawings.

FIG. 1 is a perspective view, partly in section, of a tone arm subassembly with a portion thereof cut away to show the operation of the cueing lever of the present invention in the tone-arm-up position;

FIG. 2 is a view similar to FIG. 1 but shown with the cueing lever in the tone-arm-down position;

FIG. 3 is a fragmentary sectional view taken along the line 3—3 of FIG. 1.

Considering the manner in which the cueing lever 26 functions to raise and lower the tone arm 14 manually, in accordance with an important aspect of the present invention a simple tone arm actuating mechanism is provided for relatively quickly lifting the tone arm 14 upwardly off of a record in response to movement of the cueing lever 26 to a generally horizontal position while at the same time providing a relatively gradual lowering of the tone arm when the cueing lever 26 is moved to the substantially vertical position shown in FIG. 2. More particularly, a flat spring 590 is provided with a bifurcated end portion 592 which is seated in a notch 594 (FIG. 3) in a cue lever lift rod 596. The lift rod 596 is mounted in a vertically extending bore 598 formed in a housing portion 88 of the tone arm subassembly base 76. The lift rod 596 extends through the clearance slot 177 in the quadrant 124 and a washer 597 is positioned on the rod 596 below the quadrant 124 and is held against a shoulder in the rod 596 by means of a coil spring 599 which is positioned between the washer 597 and the end portion 601 of the rod 596.

The lift rod 596 is provided with transverse grooves 600 within which is positioned a viscous material and the fit between the lift rod 596 and the bore 598 is relatively close so that a dash pot type of action is produced in response to forces exerted on the post 596 by the spring 590. The flat spring 590 extends beneath a downwardly extending flange portion 602 of the base 76 and the horizontal portion 604 of the cueing lever 26 is provided with an offset central portion 606 which engages the underside of the spring 590 between the post 596 and the flange 602. A right angle end portion 605 of the lever 26 is retained in a suitable recess in the base 76. The end of the spring 590 is secured to the tone arm subassembly base 76 by any suitable means which provides adjustment of the flexure of this spring. In FIG. 1 an arrangement is shown wherein a screw 608 is threaded into a depending boss 610 on the member 76. The head of the screw 608 is adjustable from beneath the record changer and as the screw is tightened the spring 590 is flexed around the transverse partition 602.

In the alternative arrangement shown in FIG. 2 a screw 612 is threaded through the boss 610 and is secured in any suitable manner to the end of the spring 590. The screw 612 is provided with a head portion 614 which is accessible from the top of the tone arm subassembly so that adjustment of the cueing lever setdown speed can be made without removing the changer from its housing.

When the cueing lever 26 is moved from the tone arm down position shown in FIG. 2 to the tone arm up position shown in FIG. 1, the intermediate offset portion 606 of the lever 26 is rotated into engagement with the underside of the spring 590 and exerts an upward force on the lift rod 596 so that this rod moves upwardly and the top end thereof engages the underside of the plate 94 on the tone arm so that the tone arm is lifted off of the record. The force exerted by the spring 590 in lifting the tone arm is relatively great as compared with the lowering force exerted by the spring 590 because the offset portion 606 of the cueing lever 26 acts as a temporary fulcrum to raise the tone arm and this fulcrum is relatively close to the lift rod 596. With this relatively short fulcrum the spring 590 is relatively stiff and a relatively quick tone arm lifting action is provided. When the lift rod 596 is moved upwardly, the washer 597 engages the underside of the quadrant 124 as the spring 599 is depressed so that a frictional drag is exerted on the tone arm 14. This frictional drag is sufficient to prevent the tone arm 14 from moving outwardly under the force of a constant bias spring when the tone arm is lifted off of or lowered onto a record. In less expensive changer models, this constant bias spring may be eliminated. In such case, the spring 599 and washer 597 may be eliminated. The viscous material in the grooves 600 may also be eliminated in such a low-cost changer so that the tone arm 14 is raised and lowered directly. This change is made possible in the arrangement of the present invention because separate lift rods are provided for automatic and manual operation, respectively.

When it is desired to lower the tone arm onto the the record, the cueing lever 26 is moved from the tone arm up position shown in FIG. 1 to the tone arm down position shown in FIG. 2. When this occurs the offset portion 606 is removed from beneath the spring 590. As soon as the intermediate portion 606 ceases to engage the underside of the spring 590 a new fulcrum point is established for the spring which is the transverse partition 602. Since the partition 602 is spaced a substantially greater distance from the lift rod 596 than the offset portion 606, a relatively smaller spring force is exerted on the lift rod 596 to move this rod downwardly within the bore 598 against the section of the viscous material in the grooves 600. Accordingly, the tone arm is very gently and smoothly lowered onto the record or into engagement with the rest post 22 when the cueing lever is moved to the tone arm down position. As discussed heretofore the screw 608, or the screw 612, can be adjusted so as to provide a desired degree of flexure of the spring 590 and hence an adjustment of the set down speed of the tone arm.

While there been illustrated and described the preferred embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A phonograph record player mechanism which includes a tone arm, means for mounting the tone arm for rotation about an axis, a cueing lever lift rod for causing movement of said arm by engagement therewith at a point spaced from the said axis, dash pot means associated with said lift rod for opposing motion thereof, a generally flat spring having one end thereof connected to the lift rod and the other end thereof secured to the mechanism chassis, means defining a fixed shoulder in engagement with one side of the spring which faces said tone arm, and a cueing lever which is rotatable about a substantially horizontal axis and has a portion which engages said spring in an area between the lift rod and the said shoulder and raises said area by physical engagement therewith when the cueing lever is rotated about the said horizontal axis.

2. A record player mechanism according to claim 1, wherein a first portion of the said spring between said area of engagement of said cueing lever portion and said lift rod is employed to raise the tone arm at a predetermined rate, and a second portion of said spring between said fixed shoulder and said lift rod is employed to lower the tone arm at a rate which is substantially slower than said predetermined rate.

3. The combination of a tone arm, means for mounting said tone arm for rotation about an axis, a cueing lever lift rod, means including said lift rod for exerting an upward force on said tone arm at a point spaced from said axis, a spring having one end thereof connected to said lift rod, means defining a fixed shoulder in engagement with one portion of said spring, means connected to said spring beyond said fixed shoulder for flexing said spring about said shoulder and urging said lift rod in one direction, and a cueing lever rotatable about a horizontal axis and having a portion which engages said spring between said lift rod and said shoulder when said cueing layer is rotated about said axis, engagement of said spring by said cueing lever portion causing said lift rod to move in the opposite direction.

4. A record player mechanism as claimed in claim 3, which includes means for adjusting the flexure of said spring about said fixed shoulder, thereby to control the rate at which the lift rod is moved in said one direction.

5. The combination of claim 3, which includes means for adjusting the flexure of said spring about said fixed shoulder, thereby to control the rate at which said lift rod is moved in said one direction.

6. In a phonograph record player, the combination of, a tone arm, means for mounting said tone arm for rotation about an axis, a cueing lever lift rod, means including said lift rod for exerting an upward force on said tone arm at a point spaced from said axis, a flat spring having one end thereof connected to said lift rod, means defining a fixed shoulder in engagement with one side of said spring, and a cueing lever rotatable about a horizontal axis and having a portion which engages the other side of said spring between said lift rod and said shoulder and raises the intermediate portion of said spring upwardly by physical engagement therewith when said cueing lever is rotated about said horizontal axis.

7. The combination of claim 6, wherein a first portion of said spring between the point of engagement of said cueing lever portion and said lift rod is employed to raise said tone arm at a predetermined rate, and a second portion of said spring between said fixed shoulder and said lift rod which is substantially longer than said first spring portion is employed to lower said tone arm at a rate which is substantially slower than said predetermined rate.

* * * * *